United States Patent [19]
Brown et al.

[11] Patent Number: 6,026,073
[45] Date of Patent: Feb. 15, 2000

[54] ROUTE FINDING IN COMMUNICATIONS NETWORKS

[75] Inventors: Graeme Nicholas Brown, Ipswich, United Kingdom; Raymond Soo Khiaw Chng, Singapore, Singapore

[73] Assignee: British Telecommunications public limited company, London, United Kingdom

[21] Appl. No.: 08/894,781

[22] PCT Filed: Aug. 6, 1996

[86] PCT No.: PCT/GB96/01913

§ 371 Date: Aug. 28, 1997

§ 102(e) Date: Aug. 28, 1997

[87] PCT Pub. No.: WO97/06644

PCT Pub. Date: Feb. 20, 1997

[30] Foreign Application Priority Data

Aug. 7, 1995 [EP] European Pat. Off. .............. 95305493

[51] Int. Cl.[7] .................................................. G01R 31/08
[52] U.S. Cl. ............................................................ 370/216
[58] Field of Search ................................... 370/216, 227, 370/228, 229, 237, 248; 395/182.02, 325

[56] References Cited

U.S. PATENT DOCUMENTS

| | | | |
|---|---|---|---|
| 4,956,835 | 9/1990 | Grover | 370/228 |
| 5,435,003 | 7/1995 | Chng et al. | 395/575 |
| 5,537,532 | 7/1996 | Chng et al. | 395/182.02 |

FOREIGN PATENT DOCUMENTS

| | | |
|---|---|---|
| 0 436 201 | 7/1991 | European Pat. Off. . |
| 0436201 A1 | 7/1991 | European Pat. Off. . |
| 0 461 279 | 12/1991 | European Pat. Off. . |
| 0461279 A1 | 12/1991 | European Pat. Off. . |
| 0 538 853 | 4/1993 | European Pat. Off. . |
| 0538853 A2 | 4/1993 | European Pat. Off. . |
| 0538853 A3 | 4/1993 | European Pat. Off. . |

OTHER PUBLICATIONS

Bhatnagar et al, "Layer Net: A New Self–Organising Network Protocol", IEEE Military Communications Conference, vol. 2, Sep. 30, 1990, Monterey US, pp. 845–849, XP000221754.

IEEE Military Communications Conference, vol. 2, Sep. 30, 1990, Monterey US, pp. 845–849, XP00221754 Bhatnagar et al.: "Layer Net: A new self–organising network protocol" see section 2.5: 'Scheduling of links'.

*Primary Examiner*—Huy D. Vu
*Assistant Examiner*—Alexander Boakye
*Attorney, Agent, or Firm*—Nixon & Vanderhye P.C.

[57] ABSTRACT

A method of determining a restoration route (or an additional route) in a fully or partially meshed communications network of nodes, in which the step of sending a route-finder signature from a node to a neighboring node on one of a plurality of spare links of a span to the neighboring node includes the prior substeps of: determining whether the node has a higher or a lower ranking network node identity than that of the neighboring node; and if it is higher ranking, sending the route-finder signature on the spare link corresponding to the lowest ranking of the node ports associated with said span; or if it is lower ranking, sending the route-finder signature on the spare link corresponding to the highest ranking of the node ports associated with the span. Any contention which occurs because the two nodes connected to a span make provisional allocation for one or more links simultaneously to different restoration routes is dealt with by a contention protocol in which the highest ranking of the two nodes knows that its provisional allocation will be confirmed, and the lower ranking of the two nodes knows that it must send a backtrack signature for the capacity that is not available.

9 Claims, 2 Drawing Sheets

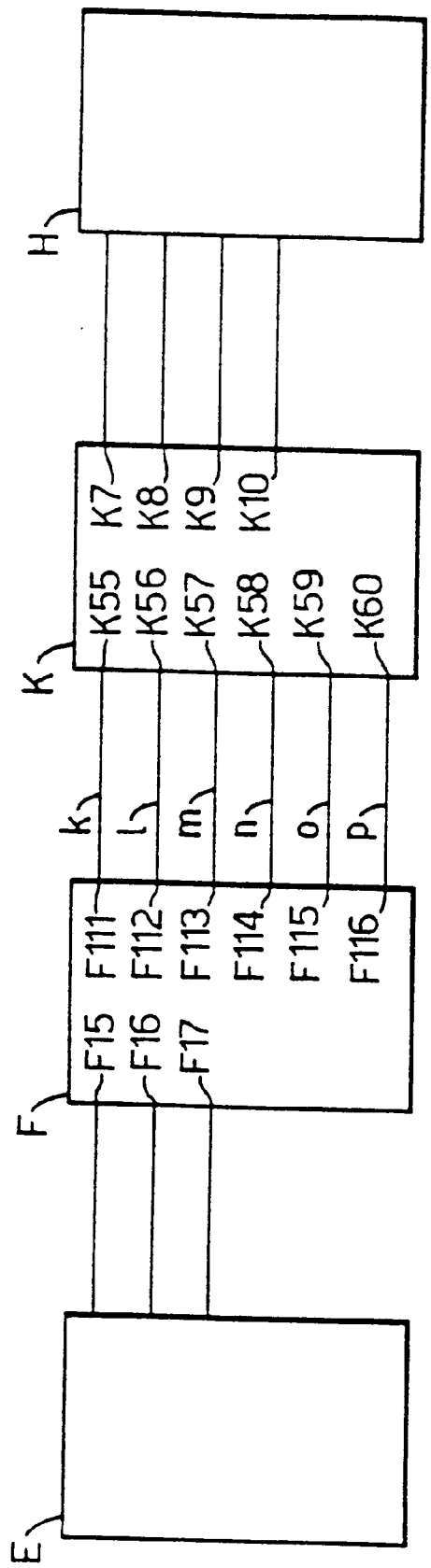

ROUTE FINDING IN COMMUNICATIONS NETWORKS

BACKGROUND OF THE INVENTION

1. Field of the Invention

This invention relates to a method of finding, or determining, a route in a communication network; to a node arranged to perform the method; and to a network comprising such nodes. A route may be needed to replace an existing route which has failed, and such a route is referred to as a restoration route, or a route may be required to supplement an existing route which is becoming congested. As used herein, the term "additional route" embraces both restoration routes and supplementary routes.

2. Description of Related Art

It is known, for example from the article "The Self-Healing Network: A Fast Distributed Restoration Technique For Networks Using Digital Cross-Connect Machines", W. D. Grover, IEEE Globecom 87, and from U.S. Pat. No. 4,956,835 (Wayne D. Grover) to respond at the two nodes (known as failure nodes) connected to a failed span to receipt of a span failure alarm to initiate a real-time restoration process.

The failure nodes determine on the basis of their unique network identities (IDs) which node acts as Sender and which node acts as Chooser (also known as Master and Slave, respectively).

For each of the links of the failed span the Sender repeatedly transmits (floods) respective route-finder signatures to its neighbouring nodes (known as Tandem nodes) which forward flood the signatures to their neighbouring nodes. In one embodiment in the abovementioned U.S. patent a node knows only its own identity (ID) and learns the ID of the node to which connectivity has been lost by reading the last valid contents of a receive signature register on the affected port(s) corresponding to the failed link(s), and in an alternative embodiment, a node stores and maintains a neighbour node ID table.

The node which decides to act as Chooser now enters a waiting state and remains in it until it receives a route-finder signature. Then it responds by transmitting a respective complementary reverse-linking signature (also known as a confirmation or return signature) to the Tandem node from which the route-finder signature was received. The confirmation signature travels back through the Tandem nodes establishing the required switch connections between node input and output ports, and eventually arrives at the Sender node, which then ceases transmitting the respective route-finder signatures, and proceeds to transmit on that newly established restoration route the traffic which would have been transmitted on the corresponding link of the failed span.

The abovementioned U.S. patent also discloses that the restoration mechanism can be used for automatic provisioning of new circuit routes in a network by placing two nodes, between which it is desired to provision additional (i.e. supplementary) circuit routes, directly into Sender and Chooser states with regard to an artificial fault between the selected nodes. The nodes would be supplied with artificial fault information including the number of circuit routings that are being sought.

SUMMARY OF THE INVENTION

According to a first aspect of the present invention, there is provided a method of determining an additional route in a fully or partly meshed communications network of nodes, the method comprising the step of sending a route-finder signature from a node to a neighbouring node on a spare link of a span to the neighbouring node, and being characterised by the prior steps of:

ranking the links of the span; and determining on the basis of the respective unique network node identities of the node and the neighbouring node whether the node is in a first or a second ranking relationship with respect to the neighbouring node;

and the method being characterised in that said sending step comprises:

if the node is in said first relationship, sending the route-finder signature to the neighbouring node on the lowest ranking of currently available spare links of said span; or if the node is in said second relationship, sending the route-finder signature to the neighbouring node on the highest ranking of currently available spare links of said span.

An advantage of the present invention is that the two nodes at opposite ends of a span can independently allocate links from the set of spare links in the span for restoring failed routes, starting from the highest ranked and lowest ranked spares, respectively, and thereby avoid contention for the spares, or, at worst, limit contention to the one situation in which both nodes simultaneously have provisionally allocated the same spare or spares for two different restorations. Such contention is dealt with by a contention protocol in which, e.g. the higher ranking of the two nodes knows that its provisional allocation will be confirmed, and the lower ranking of the two nodes knows that it must send a backtrack signature for the capacity that is not available.

Preferably, when said route-finder signature is a return route-finder signature, there are included the steps of:

detecting when one or more spare links of said span which have already been allocated by the node for a restoration route identified in a first return route-finder signature sent to the neighbouring node are requested for a restoration route identified in a second return route-finder signature subsequently received from the neighbouring node; and, in response, if the node is in a predetermined one of said first and said second relationships, maintaining the allocation of said one or more spare links; or if the node is in the other of said first and said second relationships, changing the allocation of said one or more spare links from the restoration route identified in said first return route-finder signature to the restoration route identified in said second return route-finder signature, sending to the slave end node which originated said first return route-finder signature a corresponding backtrack signature to cancel allocations for spare links corresponding to said one or more spare links, modifying the first return route-finder signature by reducing the content of a requested capacity field associated with the restoration route of said first return route-finder signature by the capacity of said one or more spans, and sending said modified first return route-finder signature to the neighbouring node.

Alternatively, when said route-finder signature is a return route-finder signature, there are included the steps of:

detecting that one or more spare links of said span which have already been allocated by the node for a restoration route identified in a first return route-finder signature sent to the neighbouring node are requested for a restoration route identified in a second return route-finder signature subsequently received from the neighbouring node; and, if the node is in a predetermined one of said first and said second relationships, and it is not an end node for the restoration route identified in said second return route-finder signature subsequently received from the neighbouring node; and, in response, maintaining the allocation of said one or more spare links;

modifying the received second return route-finder signature by reducing the content of a requested capacity field associated with the restoration route of said second return route-finder signature by the capacity of said one or more spans; and sending said modified second return route-finder signature to the corresponding neighbouring node.

Preferably, said sending step comprises sending the return route-finder signature on each of the n lowest ranking, or highest ranking as the case may be, of the currently available spare links of the span, where n is the content of a requested capacity field associated with the restoration route of the return route-finder signature.

According to a second aspect of the present invention, there is provided a node for use in a fully or partly meshed communications network of nodes, the node being arranged to send, in use, a route-finder signature to a neighbouring node on a spare link of a span to the neighbouring node, and characterised by being arranged to determine, in use, on the basis of the respective unique network node identities of the node and the neighbouring node whether the node is in a first or a second ranking relationship with respect to the neighbouring node; and if in said first relationship, to send the route-finder signature on the spare link corresponding to the lowest ranking of the node ports associated with said span; or if in said second relationship, to send the route-finder signature on the spare link corresponding to the highest ranking of the node ports associated with said span.

Preferably, the node is further arranged to detect when, in use, one or more spare links of said span which have been already allocated by the node for a restoration route identified in a first return route-finder signature sent to the neighbouring node are requested for a restoration route identified in a second return route-finder signature subsequently received from the neighbouring node; and, in response, if the node is in a predetermined one of said first and said second relationships, to maintain the allocation of said one or more spare links; or if the node is in the other of said first and said second relationships, to change the allocation of said one or more spare links from the restoration route identified in said first return route-finder signature to the restoration route identified in said second return route-finder signature, to send to the slave end node which originated said second return route-finder signature a corresponding backtrack signature to cancel allocations for spare links corresponding to said one or more spare links, and to send to the neighbouring node a modified said second return route-finder signature in which the content of a requested capacity field associated with the restoration route of said second return route-finder signature is reduced by the capacity of said one or more spans.

Alternatively, the node is further arranged to determine when, in use, one or more spare links of said span which have been already allocated by the node for a restoration route identified in a first return route-finder signature sent to the neighbouring node are requested for a restoration route identified in a second return route-finder signature subsequently received from the neighbouring node; and, in response, if the node is in a predetermined one of said first and said second relationships, to maintain the allocation of said one or more spare links; and if the node is not an end node for the restoration route identified in said second return route-finder signature subsequently received from the neighbouring node, to send to the corresponding neighbouring node a modified said second return route-finder signature in which the content of a requested capacity field associated with the restoration route of said second return route-finder signature is reduced by the capacity of said one or more spans.

Preferably, the node is arranged to send, in use, the return route-finder signature on each of the n lowest ranking, or highest ranking as the case may be, of the currently available spare links of the span, where n is the content of a requested capacity field associated with the restoration route of the return route-finder signature.

According to a third aspect of the present invention, there is provided a fully or partly meshed communications network of nodes, wherein the nodes are substantially identical and in accordance with the second aspect of the present invention.

BRIEF DESCRIPTION OF THE DRAWINGS

A specific embodiment of the present invention will now be described by way of example with reference to the drawings in which:

FIG. 3 is a diagram showing the connection of spare links between two nodes of the network.

DETAILED DESCRIPTION OF EXEMPLARY EMBODIMENTS

The specific embodiment of the present invention relates to a real-time restoration process for establishing a restoration route in a communications network and the following description will be limited to this although it will be appreciated that such a process need not be the sole restoration process in a network but can be combined with a pre-planned restoration process.

Figure 1:
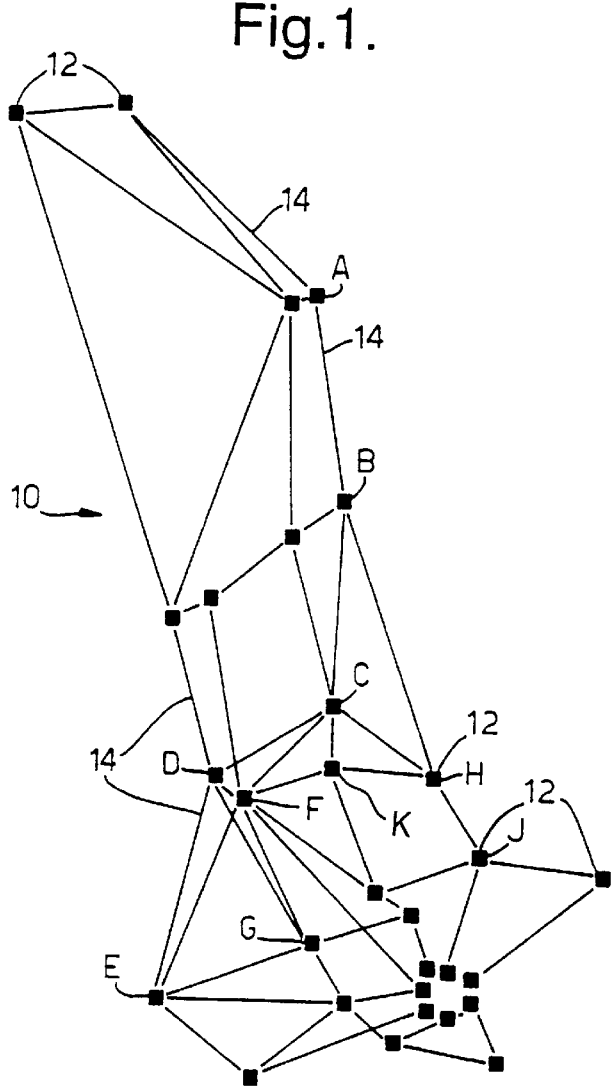
FIG. 1 is a diagram of a network of interconnected nodes.

In FIG. 1 there is shown a network 10 consisting of a number of nodes 12, each having a unique network identity, linked by spans 14. For the purposes of this description, node network identities are upper case reference letters, although in practice they are numerical, and only nodes A to K will be referred to. To avoid possible confusion the reference letter "I" is not used. Individual spans 14 will be referred to by the two node identities of the respective pair of nodes between which a span is connected, e.g. span AB (or span BA, depending on, e.g. the direction of a signature).

Figure 2:
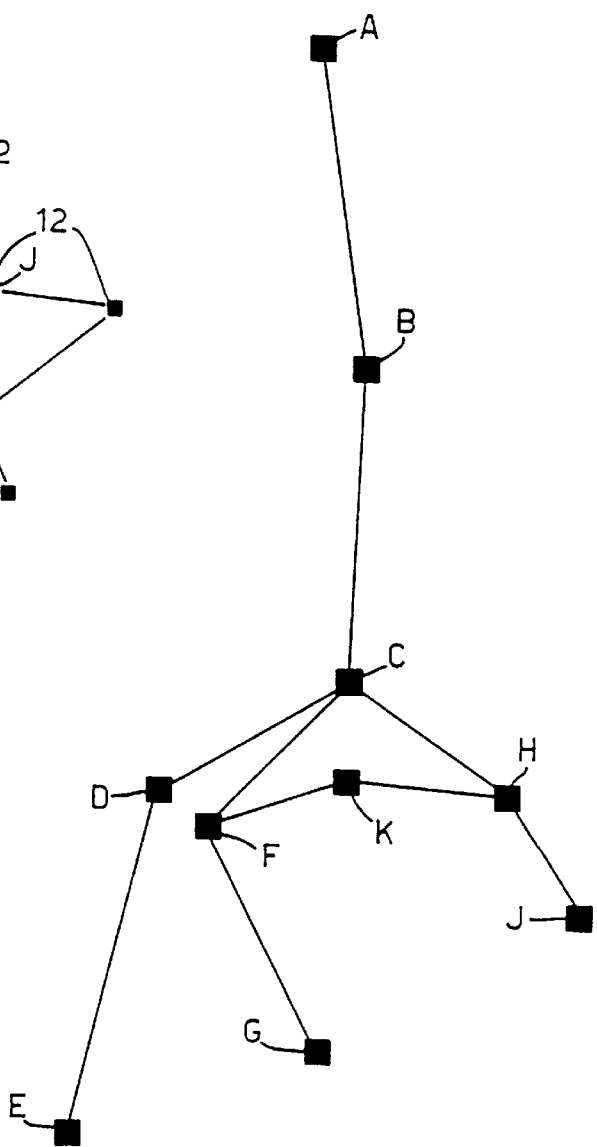
FIG. 2 is an enlarged portion of the network of FIG. 1.

Of the many routes in the network 10 between respective pairs of end nodes, this description will consider only three existing routes having unique route IDs "X", "Y", and "Z". Route X is between end nodes A and E, passing through intermediate (also known as tandem) nodes B, C and D, and comprising a sequence of bidirectional links within spans AB, BC, CD, and DE; route Y is between end nodes A and G, passing through intermediate nodes B, C and F and comprising a sequence of bidirectional links within spans AB, BC, CF, and FG; and route Z is between end nodes D and J, passing through intermediate nodes C, and H and comprising a sequence of bidirectional links within spans DC, CH, and HJ. These nodes and spans are shown in FIG. 2 in which, for clarity, other nodes and spans are omitted.

The spans between the nodes comprise working links and spare links, and each working link is part of a respective unique route. Route capacity is expressed in terms of numbers of circuits, but capacity is added, or subtracted, in link units.

Within a span the links are sequentially ranked and identified by, in this example, lower case reference letters. Specifically, with reference to FIG. 3, span FK has ten working links a to j, (not shown) and six spare links k to p. For convenience, a has the lowest ranking in this description (but there is no reason why a should not have the highest ranking). The links in a span are connected to node ports in a connection numbering convention in which the lowest ranked link is connected to the lowest ranked of corresponding ports at both associated nodes.

In this example, node F has eight spans to its neighbouring nodes (only two being shown in FIG. 3), and the links a to p of span FK are respectively connected to ports F101 to F116 of node F. Node K has four neighbouring nodes and the links a to p are correspondingly connected to ports K45 to K60 of node K.

Consider that an excavator has severed a duct close to node C and containing at that point both span CD and span CF. In this case, the nodes C and D, i.e. the failure nodes for route X, upon detecting the failure of span CD, decide that a restoration route is to be found between nodes A and E, and similarly nodes C and F decide that a restoration route is to be found between nodes A and G, and nodes D and C decide that a restoration route is to be found between nodes D and J.

For ease of explanation it will be assumed that no other routes have failed, although it will be understood that, in practice, the failure nodes will, correspondingly, act to find a respective restoration route for each of any other routes which have experienced a failed link. The order in which these restoration routes are established may be predetermined by ranking the routes in priority order, but such ranking is not part of the present invention and will not be described.

Each failure node will, as the result of the abovementioned decision, now generate a common help signature (referred to herein as a help message) for its associated failed routes, and send the common help message to the respective end nodes of the routes.

Thus, node C will send its common help message for routes X, Y and Z to nodes B and H, because those are the neighbouring nodes for these routes, node F will send its common help message for route Y to node G, and node D will send its common help message for route X to node E. It will be appreciated that although node D is a failure node for route Z it is also an end node for that route.

Each of the various signatures used in the restoration process has a header and a trailer, the header including a four bit signature type field. The various types are normal common route-finder (also referred to as forward common route-finder), reverse common route-finder (also known as backward common route-finder), route-tracer, alarm, common help, backtrack, and return (also known as confirmation).

The information section of a common route-finder signature comprises a four bit flood count field, a four bit hop count field, a four bit route ID count field, one or more sixteen bit route ID fields, and a corresponding number of eight bit circuit number fields.

The information section of a common help signature comprises a four bit route ID count field, one or more sixteen bit route ID fields, and a corresponding number of eight bit circuit number fields, so in the case of the signature sent from node C to nodes B and H, its ID count field contains the number three, the three ID fields contain, respectively, X, Y and Z, and the three associated circuit number fields contain the respective capacities of these routes.

As the common help messages pass through their respective intermediate nodes they break down connections in the corresponding failed route. Each node will forward a received common help message on the link or links which correspond to the route ID or IDs contained in the common help message.

Each node knows its own network ID and contains a table storing the route IDs for which it is an end node, and the network IDs of the other end nodes.

When node B receives the common help message, it will check its stored table to find out whether it is an end node for any of the identified routes, and where, as in this case, it is not an end node for route X or for route Y, it will transmit the common help message on the outgoing links associated with those routes (links of the span BA), and break down the connections for those routes by removing the route and link data from its connection table. Node H similarly forwards the common help message to node J.

When node A receives the common help message, it will determine that it is an end node for the routes X and Y, and proceed to determine whether it is higher ranking or lower ranking relative to the stored IDs of the other end nodes, i.e. E for route X and G for route Y, based on the unique network IDs (ordinal numbers) of the nodes. If the former, then it will act as a master node (also known as a sender node), and if the latter then it will act as a slave node (also known as a chooser node). In this example node A has a higher ranking network ID than both node E and node G, and thus on receipt of the common help message will, for establishing a restoration route for routes X and Y, assume the role of master.

Similarly, when nodes E and G receive the respective common help message, each will determine that it is an end node for a route identified in the help message, and proceed to determine whether it is higher ranking or lower ranking relative to the stored ID of the other end node for its associated route (X or Y). In this example both nodes E and G have a lower ranking network ID than node A, and thus on receipt of the common help message, each will, for establishing a restoration route for routes X and Y, assume the role of slave.

Node A, as master, now broadcasts a common forward route-finder signature for the failed routes X and Y, i.e. sends the signature on spare links to its neighbouring nodes. They in turn forward the received signature, which thus floods through the network. This signature contains the IDs of the routes X and Y, the respective requested capacities for the routes, the number two in its route ID count field, and has its flood count field set to one. As the signature floods through the network, the forwarding or relaying nodes (i.e. those nodes which are not end nodes for any route ID in the signature) increment the hop count field.

The relaying nodes forward the common signature on all spans. No check is made to see whether the spare capacity on a span is sufficient for the total capacity of a failed route, and the nodes do not mark that capacity as reserved.

The relaying nodes check the hop count of a received signature and take no action if the count is greater than a predetermined value. This sets a limit to the geographical extent of flooding. In variants, flooding control additionally or alternatively comprises checking a time of origin field in the signature and taking no action if the signature is older than a predetermined limit.

The master node A, when it has broadcast the common route-finder signature, will enter a quiescent state to await receipt of respective return signatures.

Upon node E determining that it is to act as slave for the failed route X, it starts (triggers) a timeout to await receipt of a corresponding route-finder signature containing the route ID X and thus indicating a potential restoration route of unknown capacity. If no forward route-finder signature for route X has been received by the end of the timeout period, node E will switch to act as master for route X and send a reverse route-finder signature to its neighbouring nodes, but this aspect of restoration is not part of the present invention and will not be described further.

On the first receipt of such a forward route-finder signature within the timeout, the slave node E generates a return signature (also called a route confirmation signature) and sends it back via the node from which the forward route-finder signature was received. This return signature is similar to the route-finder signature, but differs in that the content of the signature type field is changed to identify the signature as a return signature travelling towards the master node A, the route ID count field is omitted, a single route ID field is used containing the route ID X, and a single field is used for the requested capacity. The slave node E ignores any subsequently received route-finder signatures for the route X.

In this example, it has been assumed that non-disjoint restoration routes are permissible, and that the first forward route-finder signature for route X received by node E has traversed a route through nodes B, C, K and F; the first forward route-finder signature for route Y received by node G has similarly traversed a route through nodes B, C, K and F, and that the first forward route-finder signature for route Z received by node J has traversed a route through nodes F, K and H. It is also assumed that the requested capacity for routes X, Y and Z are three, two and four, respectively.

As a return signature passes through the nodes of the potential restoration route, each of these nodes checks what capacity is available, makes appropriate connections between the corresponding switch ports, and creates an eight bit node ID field, into which it writes its node ID. The node compares the requested capacity with the available capacity, and if the requested capacity is not greater than the available capacity it will make connections for the requested capacity and send the return signature to the next node of the potential restoration route. However, if the requested capacity is greater than the available capacity, the node will make connections for the available capacity and forward the signature with the number in the requested capacity field replaced by the available capacity, and also send to the slave end node a backtrack signature containing the ID of the route and the value of the difference between the requested capacity and the available capacity to take down connections that have already been made for the capacity that cannot be established on that particular restoration route.

Upon receipt of the return signature, the master node A knows that a restoration route now exists, as identified by the intermediate or relaying node IDs in the signature, and knows the capacity of that particular restoration route, and now sends a route-tracer signature to node E, via the restoration route, to inform it of the intermediate nodes of the restoration route. Where the invention is used to find a supplementary route, the route-tracer signature can be sent on the existing route. This use of a route-tracer signature is known in the art and does not form part of the present invention.

In this specific example (FIG. 3), it is assumed that the return signature from node E (for route X) arrives at node F at substantially the same time as the return signature (for route Z) arrives at node K from forwarding node H, and that E is higher ranking than F, and H is higher ranking than K.

Node E will have sent the return signature on the lowest ranking spare link of span EF, and this will have been received by node F on, say, port F15. Node F now does a number of things, namely,:

it determines the requested capacity for route X from the return signature (three) and allocates ports F15, F16 and F17 (three spare links of the span FE) for the restoration route, node E will have already determined that span EF had sufficient spare capacity;

it determines the node to which it has to send the return signature for route X and finds that this is node K;

it checks the span FK for the requested capacity and, upon finding that the requested capacity (three) is not greater than the spare capacity (six), now proceeds to determine the relative ranking of the node identities F and K and, assuming that F is higher ranking than K, allocates the three lowest ranking links, k, l, and m, for the restoration route for route X, making connections between the three ports F15, F16 and F17 and three ports F111, F112 and F113 corresponding to links k, l, and m, on span FK;

it forwards the return signature to node K on spare link k, and subsequently receives from node K a return signature for route Z.

Similarly, node K does a number of things, namely:

it determines the requested capacity (four) for route Z from the return signature forwarded by node H and allocates four ports, K7, K8, K9 and K10 on span KH, for the restoration route, node H will have already determined that span HK had sufficient spare capacity;

it determines the node to which it has to send the return signature for route Z and finds that this is node F;

it checks the span KF for the requested capacity in the return signature for route Z and, upon finding that the requested capacity (four) is not greater than the spare capacity (six), now proceeds to determine the relative ranking of the node identities K and F and, given that K is lower ranking than F, allocates the four highest ranking links, p, o, n and m, for the restoration route for route Z, making respective connections between the four ports K7, K8, K9 and K10 on span KH, and four ports K60, K59, K58 and K57, respectively corresponding to links p, o, n and m, on span KF;

it forwards the return signature to node F on link p, and subsequently receives from node F a return signature for route X.

Node K will receive on spare link k connected to its port K55 the return signature for route X requesting a capacity of three links, and will enter contention mode, since it has already allocated and connected links p, o, n and m, and, similarly, node F will receive on spare link p connected to its port F116 the return signature for route Z requesting a capacity of four links, and will enter contention mode, since it has already allocated links k, l and m. In this case, the contention will be in respect of which route will take precedence over the allocation of spare link m.

On the basis of higher ranking node takes precedence, node K will:

allocate link m to the return signature for route X;

forward the return signature for route X with its capacity field unamended to node C;

change the link allocation for the restoration route for route Z to links p, o and n;

break down the connection between port K57 and the port K10 and make a new connection between port K57 and a port on the span KC;

generate a backtrack signature for route Z with the value one in the capacity field to indicate the capacity deficit, and send the backtrack signature to node H via port K10.

Since the two nodes connected to a span know the port numbers of the spare links, it is sufficient for the return signature to be sent on the lowest ranking (or highest ranking, as the case may be) spare link because the receiving node can determine, for a requested capacity of n, the n lowest ranked spare links. However, in variants, the forwarded signature can be updated by the forwarding node to contain the identities of the allocated links, or a node can send the return signature on all the spare links allocated for a route.

Suppose that node F now receives the return signature for route Y from node G, it will send a backtrack signature containing the deficit capacity that it was not able to connect, in this case, two, and node G will respond by broadcasting a reverse route-finder signature for route Y.

As mentioned above, the node A will know from the content of the circuit number field in the received return signature for route X that the capacity of the restoration route is the same as the requested value, and it will then send a route-tracer signature on the restoration route A, B, C, K, F, E, to inform node E of the identities of the tandem nodes.

On the other hand, in the case of route Z, node D will know from the content of the circuit number field in the received return signature for route Z that that the capacity of the restoration route (D, F, K, H, J) is less than the requested capacity, and will switch to act as a slave node for route Z for the deficiency and await receipt from node J of a reverse route-finder signature for route Z.

On receipt by node J of the backtrack signature sent by node K, the slave node J switches to act as a master node for route X, generates a route-finder signature with its flood count field set to two, and with the requested capacity in this signature set to the value in the backtrack signature (i.e. the circuit shortfall), and sends it to its neighbouring nodes. This signature is also referred to as a reverse route-finder signature. It will be appreciated that signatures with odd flood counts can be identified as successive attempts made by the original master to find a restoration route, and that signatures with even flood counts can be correspondingly identified as successive attempts made by the original slave.

The node A responds to first receipt of a reverse route-finder signature sent by node G by switching to act as a slave node and immediately sending a return signature on the link on which the reverse route-finder signature was received. This signature has the appropriate code for a return signature in its signature type field, has its flood count field set to two, and also has its circuit number field set to the value in the received reverse route-finder signature.

The node E, acting as a master and having sent out reverse route-finder signatures, will now be in a waiting state.

The abovedescribed method of finding a restoration route in a network can be used to find a supplementary route by sending instructions from a network control centre to the two end nodes of a congested route so that they treat the congested route as failed and initiate the method of the invention to find an additional route (also known as an alternative route) between the two end nodes.

It will be appreciated that although the embodiment has been described with reference to a small network and that for convenience the number of links of a span has been correspondingly small (sixteen), in a large network a span will comprise hundreds of working links and hundreds of spare links.

An advantage of the abovedescribed embodiment is that the two nodes at opposite ends of a span can independently allocate links from the set of spare links in the span for restoring failed routes, starting from the highest and lowest ranked spares, respectively, and thereby avoid contention for the spares until the limiting situation in which both nodes simultaneously have provisionally allocated the same spare or spares for two different restorations. It will be appreciated that such a limiting situation contention does not always occur, since the remaining spare or spares may be provisionally allocated by one node and confirmed by the other node upon receipt of the return signature before that other node is ready to check the availability of spares and make its provisional allocation for a restoration route. Any contention which does occur is dealt with by a contention protocol in which the higher ranking of the two nodes knows that its provisional allocation will be confirmed, and the lower ranking of the two nodes knows that it must send a backtrack signature for the capacity that is not available.

We claim:

1. A method of determining an additional route in a fully or partly meshed communications network of nodes, the method comprising the step of sending a route-finder signature from a node to a neighboring node on a spare link of a span to the neighboring node, and including the prior steps of:

ranking the links of the span; and determining on the basis of the respective unique network node identities of the node and the neighboring node whether the node is in a first or a second ranking relationship with respect to the neighboring node;

said sending step comprising:

if the node is in said first relationship, sending the route-finder signature to the neighboring node on the lowest ranking of currently available spare links of said span; or if the node is in said second relationship, sending the route-finder signature to the neighboring node on the highest ranking of currently available spare links of said span.

2. A method as in claim 1, wherein said route-finder signature is a return route-finder signature, and also including the steps of:

detecting when one or more spare links of said span which have already been allocated by the node for a restoration route identified in a first return route-finder signature sent to the neighboring node are requested for a restoration route identified in a second return route-finder signature subsequently received from the neighboring node; and, in response, if the node is in a predetermined one of said first and said second relationships, maintaining the allocation of said one or more spare links; or if the node is in the other of said first and said second relationships, changing the allocation of said one or more spare links from the restoration route identified in said first return route-finder signature to the restoration route identified in said second return route-finder signature, sending to the slave end node which originated said first return route-finder signature a corresponding backtrack signature to cancel allocations for spare links corresponding to said one or more spare links, modifying the first return route-finder signature by reducing the content of a requested capacity field associated with the restoration route of said first return route-finder signature by the capacity of said one or more spans, and sending said modified first return route-finder signature to the neighboring node.

3. A method of determining an additional route in a fully or partly meshed communications network of nodes, the method comprising the step of sending a route-finder signature from a node to a neighboring node on a spare link of a span to the neighboring node, and also comprising the prior steps of:

ranking the links of the span; and determining on the basis of the respective unique network node identities of the node and the neighboring node whether the node is in a first or a second ranking relationship with respect to the neighboring node;

said sending step comprising:

if the node is in said first relationship, sending the route-finder signature to the neighboring node on the lowest ranking of currently available spare links of said span; or if the node is in said second relationship, sending the route-finder signature to the neighboring node on the highest ranking of currently available spare links of said span;

wherein said route-finder signature is a return route-finder signature, and also including the steps of:

detecting that one or more spare links of said span which have already been allocated by the node for a restoration route identified in a first return route-finder signature sent to the neighboring node are requested for a restoration route identified in a second return route-finder signature subsequently received from the neighboring node; and, if the node is in a predetermined one of said first and said second relationships, and it is not an end node for the restoration route identified in said second return route-finder signature subsequently received from the neighboring node; and, in response, maintaining the allocation of said one or more spare links;

modifying the received second return route-finder signature by reducing the content of a requested capacity field associated with the restoration route of said second return route-finder signature by the capacity of said one or more spans; and sending said modified second return route-finder signature to the corresponding neighboring node.

4. A method as in claim 2 wherein said sending step comprises:

sending the return route-finder signature on each of the n lowest ranking, or highest ranking as the case may be, of the currently available spare links of the span, where n is the content of a requested capacity field associated with the restoration route of the return route-finder signature.

5. A node for use in a fully or partly meshed communications network of nodes, the node including:

means to send, in use, a route-finder signature to a neighboring node on a spare link of a span to the neighboring node, and means to determine, in use, on the basis of the respective unique network node identities of the node and the neighboring node whether the node is in a first or a second ranking relationship with respect to the neighboring node; and if in said first relationship, to send the route-finder signature on the spare link corresponding to the lowest ranking of the node ports associated with said span; or if in said second relationship, to send the route-finder signature on the spare link corresponding to the highest ranking of the node ports associated with said span.

6. A node as in claim 5, further including:

means to detect when, in use, one or more spare links of said span which have been already allocated by the node for a restoration route identified in a first return route-finder signature sent to the neighboring node are requested for a restoration route identified in a second return route-finder signature subsequently received from the neighboring node; and, in response, if the node is in a predetermined one of said first and said second relationships, to maintain the allocation of said one or more spare links; or if the node is in the other of said first and said second relationships, to change the allocation of said one or more spare links from the restoration route identified in said first return route-finder signature to the restoration route identified in said second return route-finder signature, to send to the slave end node which originated said second return route-finder signature a corresponding backtrack signature to cancel allocations for spare links corresponding to said one or more spare links, and to send to the neighboring node a modified said second return route-finder signature in which the content of a requested capacity field associated with the restoration route of said second return route-finder signature is reduced by the capacity of said one or more spans.

7. A node as in claim 5, further including:

means to determine when, in use, one or more spare links of said span which have been already allocated by the node for a restoration route identified in a first return route-finder signature sent to the neighboring node are requested for a restoration route identified in a second return route-finder signature subsequently received from the neighboring node; and, in response, if the node is in a predetermined one of said first and said second relationships, to maintain the allocation of said one or more spare links; and if the node is not an end node for the restoration route identified in said second return route-finder signature subsequently received from the neighboring node, to send to the corresponding neighboring node a modified said second return route-finder signature in which the content of a requested capacity field associated with the restoration route of said second return route-finder signature is reduced by the capacity of said one or more spans.

8. A node as in claim 6 and including:

means to send, in use, the return route-finder signature on each of the n lowest ranking, or highest ranking as the case may be, of the currently available spare links of the span, where n is the content of a requested capacity field associated with the restoration route of the return route-finder signature.

9. A fully or partly meshed communications network of nodes, wherein the nodes are substantially identical and as in claim 5.

* * * * *